United States Patent
Knuettel et al.

(10) Patent No.: US 10,457,214 B2
(45) Date of Patent: Oct. 29, 2019

(54) METHOD FOR FOLDING IN A MOTOR VEHICLE EXTERIOR MIRROR

(71) Applicant: Ford Global Technologies, LLC, Dearborn, MI (US)

(72) Inventors: Martin Knuettel, Cologne (DE); Robert Spahl, Cologne (DE); Igor Fischbein, Cologne (DE); Torsten Gerhardt, London (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/949,379

(22) Filed: Apr. 10, 2018

(65) Prior Publication Data
US 2018/0361936 A1    Dec. 20, 2018

(30) Foreign Application Priority Data
Jun. 14, 2017 (DE) .................. 10 2017 210 036

(51) Int. Cl.
*B60R 1/074* (2006.01)
*B60Q 9/00* (2006.01)
*B60J 5/04* (2006.01)

(52) U.S. Cl.
CPC ............. *B60R 1/074* (2013.01); *B60J 5/047* (2013.01); *B60Q 9/008* (2013.01)

(58) Field of Classification Search
CPC .......... B60R 1/074; B60R 1/025; B60R 1/06; B60R 1/0612; B60R 1/0617; B60R 1/076; B60J 5/047; B60J 5/0472; B60J 5/0473; B60J 5/0477; B60Q 9/008
See application file for complete search history.

(56) References Cited

U.S. PATENT DOCUMENTS

| 7,591,504 | B1 * | 9/2009 | Schrader ............... B60J 5/0476 296/146.12 |
| 9,487,142 | B2 | 11/2016 | Sobecki et al. |
| 2013/0293974 | A1 * | 11/2013 | Hartmann ................. B60R 1/06 359/841 |

FOREIGN PATENT DOCUMENTS

| DE | 19808181 A1 | 9/1999 |
| DE | 202005006903 U1 | 8/2006 |
| DE | 102008010396 A1 | 8/2009 |
| DE | 102012008914 A1 | 11/2013 |
| DE | 102016122064 A1 | 6/2017 |

* cited by examiner

*Primary Examiner* — Cara E Rakowski
*Assistant Examiner* — Christopher A Lamb, II
(74) *Attorney, Agent, or Firm* — Carlson, Gaskey & Olds, P.C.

(57) ABSTRACT

A method according to an exemplary aspect of the present disclosure includes, among other things, folding in an exterior mirror of a motor vehicle having a door with a rear-mounted hinge. The exterior mirror is folded in when the door is opened and when at least one of the following conditions is met: (1) an obstacle is detected adjacent the door or (2) a speed at which the door is opened is less than a predefined threshold value. A motor vehicle configured to perform the method is also disclosed.

15 Claims, 2 Drawing Sheets

METHOD FOR FOLDING IN A MOTOR VEHICLE EXTERIOR MIRROR

RELATED APPLICATIONS

This application claims priority to German Patent Application No. 102017210036.2, filed on Jun. 14, 2017, the entirety of which is herein incorporated by reference.

TECHNICAL FIELD

This disclosure relates to a method for automatically folding in an exterior mirror of a motor vehicle having a door with a rear-mounted hinge (i.e., a "suicide door"). This disclosure also relates to a motor vehicle configured to perform the method.

BACKGROUND

Motor vehicles are known to include exterior mirrors, which are sometimes referred to as side mirrors, side view mirrors, wing mirrors, or outside rear-view mirrors. Exterior mirrors are attached to the exterior of the motor vehicle, on both the driver and passenger sides of the vehicle. The exterior mirrors help the driver see areas behind and to the sides of the vehicle. In some vehicles, the exterior mirrors fold against the vehicle exterior when the vehicle is parked to prevent damage that may be caused by closely passing vehicles, for example.

In some mirrors, such as those described in DE 10 2012 008 914 A1, the automatic folding-in of the mirror is carried out when the ignition is shut off and a proximity sensor mounted on the mirror detects no object in a rearward detection zone, and possibly only when a door contact switch indicates that the vehicle door is being opened. The rearward detection zone of the proximity sensor is so narrow that a garage wall, for example, is not detected as an object. In this way, upon parking in a narrow garage and switching off the ignition, the exterior mirror is immediately folded in when no object is detected in the rearward detection zone. If an object is detected, the mirror remains folded out and a vehicle occupant can continue to observe the traffic behind the vehicle.

In other known mirrors, such as those described in DE 198 08 181 A1, the exterior mirror are folded in with the aid of a distance or proximity sensor built into the mirror. Specifically, the mirror is automatically folded in without assistance by the driver when the sensor detects an object with which the mirror could collide.

SUMMARY

A method according to an exemplary aspect of the present disclosure includes, among other things, folding in an exterior mirror of a motor vehicle having a door with a rear-mounted hinge. The exterior mirror is folded in when the door is opened and when at least one of the following conditions is met: (1) an obstacle is detected adjacent the door or (2) a speed at which the door is opened is less than a predefined threshold value.

In a further non-limiting embodiment of the foregoing method, the method includes determining that the door has been opened in response to a signal from a door-release sensor or a door-opening-state sensor.

In a further non-limiting embodiment of any of the foregoing methods, the obstacle is detected on a side of the motor vehicle corresponding to the exterior mirror.

In a further non-limiting embodiment of any of the foregoing methods, the obstacle is detected using a blind-spot warning system.

In a further non-limiting embodiment of any of the foregoing methods, the blind-spot warning system detects an object next to or behind the motor vehicle.

In a further non-limiting embodiment of any of the foregoing methods, the exterior mirror is folded in when a remaining door-opening angle of the door is less than a predefined threshold value.

In a further non-limiting embodiment of any of the foregoing methods, the folding in step is not performed when none of the conditions have been met.

In a further non-limiting embodiment of any of the foregoing methods, the exterior mirror is foldable to a folded in position, a folded out position, and a plurality of intermediate positions between the folded in and folded out positions.

In a further non-limiting embodiment of any of the foregoing methods, the exterior mirror is moved to one of the intermediate positions when the vehicle door is opened at a predefined speed.

In a further non-limiting embodiment of any of the foregoing methods, the exterior mirror is moved to one of the intermediate positions when the vehicle door is opened by a predefined angle.

In a further non-limiting embodiment of any of the foregoing methods, the exterior mirror is mounted to a body of the vehicle ahead of the vehicle door relative to a direction of forward travel.

In a further non-limiting embodiment of any of the foregoing methods, the exterior mirror is mounted on the vehicle door.

In a further non-limiting embodiment of any of the foregoing methods, the exterior mirror is folded in with the aid of an electric motor.

A motor vehicle according to an exemplary aspect of the present disclosure includes, among other things, a door with a rear-mounted hinge, and an exterior mirror moveable between a folded in position and a folded out position. The exterior mirror is folded in when the door is opened and when at least one of the following conditions is met: (1) an obstacle is detected on a side of the vehicle corresponding to that of the exterior mirror, (2) a blind-spot warning system of the exterior mirror detects an object adjacent the vehicle, or (3) a speed at which the door is opened is less than a predefined threshold value.

In a further non-limiting embodiment of the foregoing motor vehicle, the vehicle comprises a control unit configured to determine when the door is opened and to command the exterior mirror to fold to the folded in position when at least one of the conditions is met.

In a further non-limiting embodiment of any of the foregoing motor vehicles, the vehicle comprises one of a door-release sensor and a door-opening-state sensor in communication with the control unit. Further, the control unit is configured to interpret signals from either the door-release sensor or the door-opening state sensor to determine when the door is opened.

In a further non-limiting embodiment of any of the foregoing motor vehicles, the blind-spot warning system is in communication with the control unit and detects an object next to or behind the motor vehicle.

In a further non-limiting embodiment of any of the foregoing motor vehicles, the control unit commands the exterior mirror to fold to the folded in position when a remaining door-opening angle of the door is less than a predefined threshold value.

In a further non-limiting embodiment of any of the foregoing motor vehicles, the exterior mirror is mounted either (1) on a body of the vehicle ahead of the door relative to a direction of forward travel or (2) on the door.

In a further non-limiting embodiment of any of the foregoing motor vehicles, the exterior mirror is folded in with the aid of an electric motor.

BRIEF DESCRIPTION OF THE DRAWINGS

In FIG. 2, the driver-side exterior mirror is mounted on the vehicle door.

In FIG. 3, the driver-side exterior mirror is mounted on the vehicle body.

DETAILED DESCRIPTION

Figure 1:
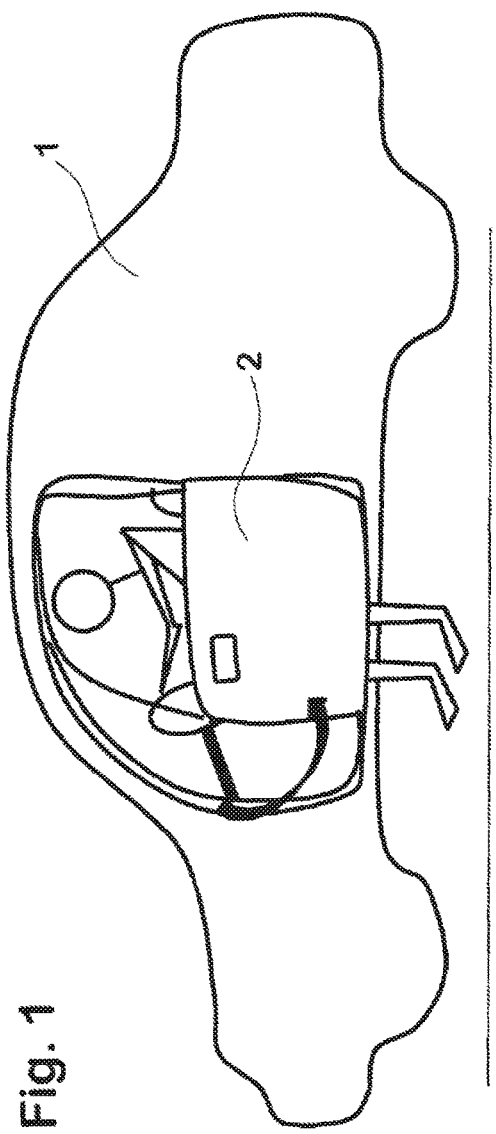
FIG. 1 is a schematic side view of an exemplary motor vehicle ("vehicle") comprising a vehicle door having rear-mounted hinges.

This disclosure relates to a method, and a motor vehicle configured to perform the same, of automatically folding in an exterior mirror on or close to (i.e., adjacent) a door having rear-mounted hinges. Such doors are colloquially referred to as "suicide doors." In one example method, the exterior mirror is folded in in response to a signal of a door-release sensor or a door-opening-state sensor. The signals from the door-release and door-opening-state sensors are interpreted as an indication of an intention by a vehicle user to step into or out of the vehicle. In an example method, the exterior mirror is only folded in when ultrasonic sensors on the vehicle detects an obstacle on the side of the vehicle corresponding to that of the exterior mirror, a blind-spot warning system in the exterior mirror warns against an object detected next to or behind the vehicle, or the door-opening speed is below a predefined threshold value.

Vehicle doors having rear-mounted hinges (again, "suicide doors") make it more convenient to step into and out of the vehicle, particularly in narrow parking spaces. However, this advantage is often limited or nullified in that the associated exterior mirror limits the space available for stepping into and out of the vehicle. This applies not only for exterior mirrors, which are mounted on the vehicle body ahead of the door, in the direction of travel, but also for exterior mirrors mounted on the door itself.

In many motor vehicles, exterior mirrors are folded in in or out in response to the switching off or on, respectively, of the ignition. In many other motor vehicles, the exterior mirror is forcibly coupled to the door, and therefore the exterior mirror is folded in and out in proportion to the opening angle of the door. None of these measures is optimal for a vehicle door having rear-mounted hinges. Either these measures do not provide assistance for stepping into the vehicle, or the mirror is swiveled every time the door is opened, which can be irritating for the driver and, in many situations, can also be dangerous. The present disclosure strikes a balance with respect to vehicle doors having rear-mounted hinges, in which the exterior mirror is folded in in response to certain conditions, thereby limiting movement of the mirror to a handful of situations and avoiding unnecessary movements of the mirror.

This disclosure also makes it possible to equip vehicles, which comprise vehicle doors having rear-mounted hinges, with relatively large exterior mirrors without nullifying the advantage of the convenience of stepping into and out of such doors. In addition, the strategy for folding in and folding out according to the invention is easily comprehended by the vehicle user and, therefore, is not irritating. On the contrary, a mirror swiveling in this manner even warns a vehicle user, when necessary, to not open his/her door too far too quickly.

In addition, when the vehicle user opens his/her door slowly, this is interpreted as an indication that the user is intentionally and carefully opening the door, either because he/she has detected an obstacle him/herself that the automatic obstacle detection may have overlooked, or for any other reasons that likely provide the user with little space for stepping into and out of the vehicle. In such conditions, the mirror may be folded in in an effort to increase the space for the user to step out of the vehicle.

In addition, the disclosure functions using sensors that are often available anyway in modern vehicles.

In exemplary embodiment of this disclosure, the automatic folding-in of the exterior mirror is carried out in response to a signal of a door-release sensor or a door-opening-state sensor when the remaining door-opening angle of the vehicle door is less than a predefined threshold value. In other words, the exterior mirror is first folded in when none of the other conditions has been met, and when the vehicle door has been opened to a relatively great extent. When the vehicle door is not opened to such a great extent, it is relatively likely that there is either no intention to step into or out of the vehicle, or that the user does not consider it a problem to step into or out of the vehicle. In addition, a vehicle occupant may retain the view toward the rear until he/she has opened the vehicle door to a great extent.

In another exemplary embodiment of this disclosure, the automatic folding-in of the exterior mirror in response to the signal of the door-release sensor or the door-opening-state sensor is prohibited when none of the aforementioned conditions has been met.

In yet another exemplary embodiment of this disclosure, the exterior mirror can assume not only a folded out position and a folded in position, but also one or several stable intermediate positions into which the exterior mirror is moved in the case of certain door-opening speeds and/or door-opening angles. Door-opening speeds or degrees of door opening are additional indications of how much a vehicle user requires assistance to step into or out of the vehicle in the form of the exterior mirror folding in, and the door-opening speeds or degrees of door opening therefore make it possible to even further avoid unnecessary movements of the mirror.

Figure 2:
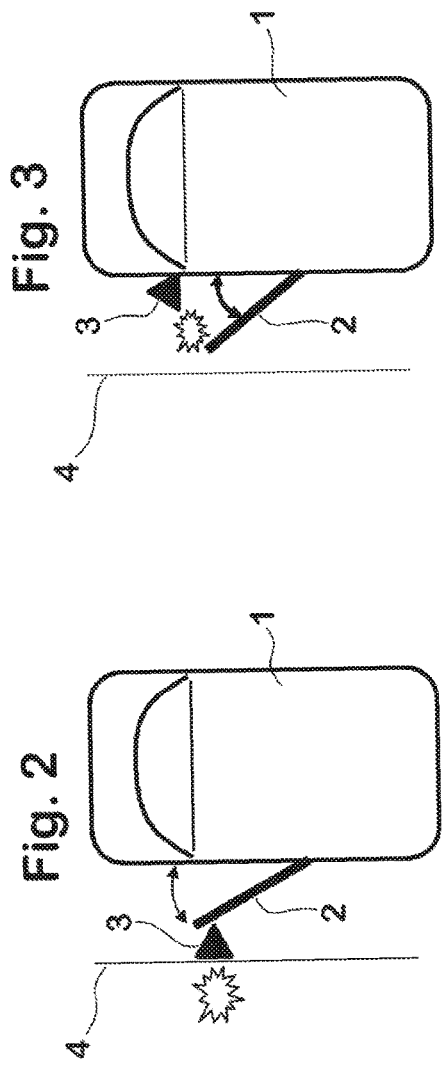
FIG. 2 shows a schematic top view of the vehicle from FIG. 1 in a parking space.

With reference to the figures, and with specific reference to FIGS. 1 and 2, an exemplary vehicle 1 includes a vehicle door 2 with one or more rear-mounted hinges. Again, such doors are colloquially known as "suicide doors." The door 2 in this example is a driver side door. This disclosure extends to vehicles wherein all passenger doors have rear-mounted hinges. This disclosure also extends to other vehicles wherein only some doors have rear-mounted hinges.

Figure 3:
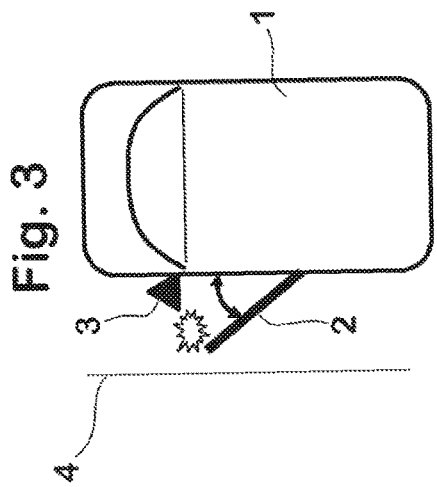
FIG. 3 shows a schematic top view of the vehicle from FIG. 1 in a parking space.

The vehicle 1 further includes an exterior mirror 3 mounted on the door 2. The exterior mirror 3 may limit the space available for a user to step into and out of the vehicle 1, because in a narrow parking space, for example, the exterior mirror 3 would first impact a wall 4 or another obstacle when the door 2 is opened, which restricts the ability of the door 2 to open and may otherwise cause the exterior mirror 3 to become damaged. Further, when the exterior mirror 3 is mounted on the vehicle body adjacent the door 2, for example on an A-pillar, the space available for a user to step into and out of the vehicle 1 is directly limited by the exterior mirror 3, as is apparent in FIG. 3. In FIG. 3, the exterior mirror 3 is mounted forward of the door 2 relative to a forward travel direction.

While FIGS. 1-3 illustrate an exterior mirror 3 adjacent a driver side door, it should be understood that this disclosure extends to mirrors mounted elsewhere on a vehicle, including adjacent a passenger side door.

Doors with rear-mounted hinges have the advantage of allowing a user to conveniently step into and out of the vehicle, and this disclosure maintains that advantage even when the vehicle 1 is parked in narrow parking spaces. Specifically, the exterior mirror 3 is designed to be capable of automatically folding in and, in certain situations, is compulsorily folded in, as is described in the following in greater detail.

The exterior mirror 3 can be folded in and out in different ways, in principle, for example with the aid of a preloaded spring which is coupled to a door locking mechanism, by means of a mechanical connecting rod between the mirror head and the door frame, or by means of an electric motor. The exemplary method for automatically folding in the exterior mirror 3, which is described in the following with reference to FIG. 4, may be easiest to implement, however, by means of an electric motor-operated drive of the exterior mirror 3. That said, this disclosure is not limited to any particular mechanism configured to fold the exterior mirror 3, and extends to all such mechanisms.

Figure 4:
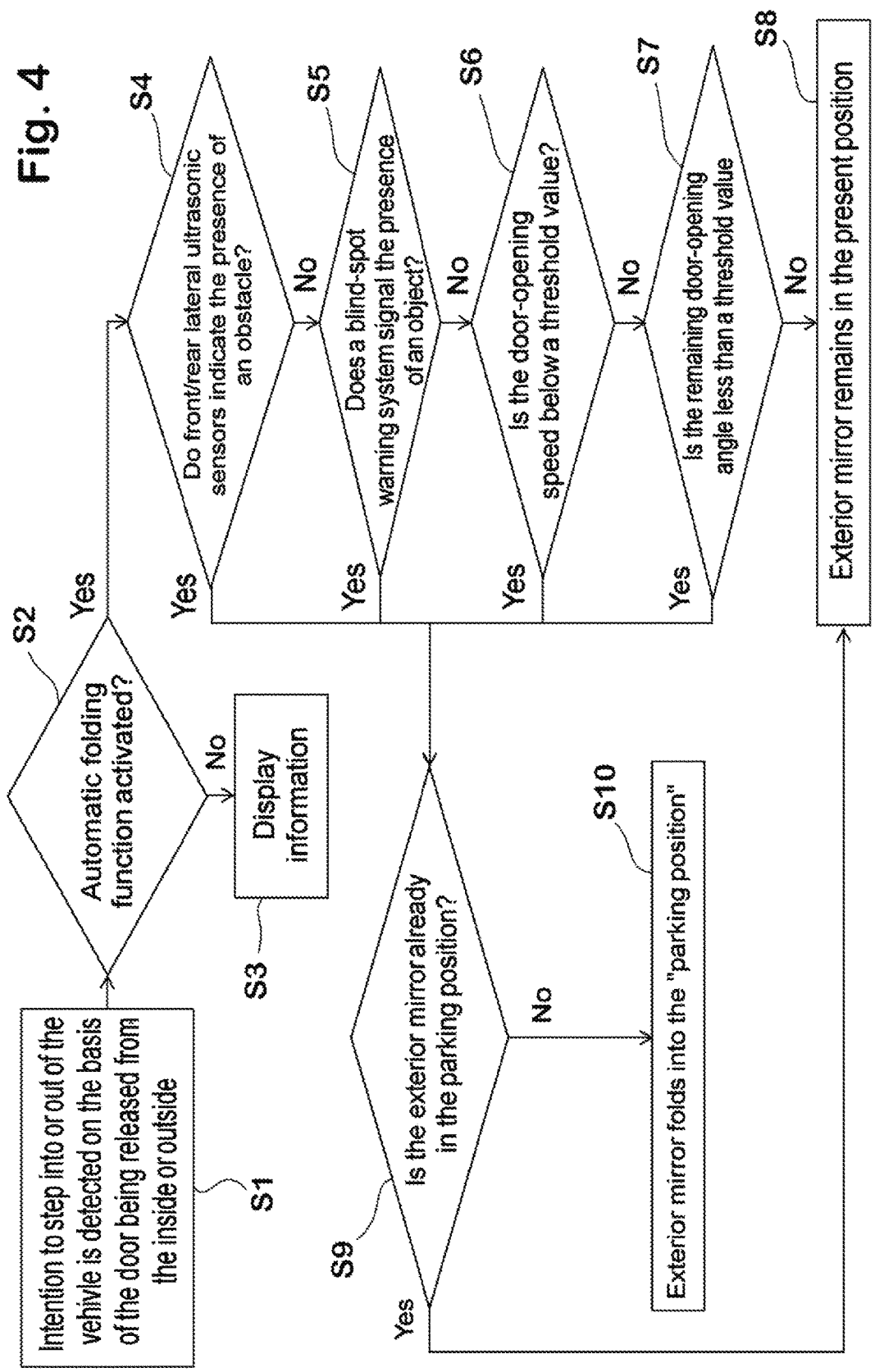
FIG. 4 is a flow chart representative of an example method for automatically folding in an exterior mirror of a motor vehicle as in FIGS. 1 to 3.

Further, the method of FIG. 4 refers to various sensors. Those sensors may be any known type of sensor appropriate to carry out the disclosed method. It should be understood that the sensors may be in communication with, or contain, a control unit.

The control unit(s) may contain may be programmed with executable instructions for interfacing with and operating the various components of the vehicle 1. The control unit(s) additionally include a combination of hardware and software, and specifically includes a processing unit and non-transitory memory for executing the various control strategies and modes of the vehicle system. In particular, the control unit(s) are configured to interpret signals from the various sensors discussed below, and are further configured to provide commands that cause the exterior mirror 3 to fold in or out, as appropriate.

With reference to FIG. 4, the method begins by identifying an intention of a user to step into or out of the vehicle at step S1. Such an intention may be identified on the basis of signals from door-release sensors or door-opening-state sensors. At step S2, a check is carried out to determine whether the driver has activated an "automatic folding in and out of the exterior mirror" vehicle function. If not, a corresponding piece of information is displayed on an instrument display, in step S3, which informs the driver that the exterior mirror 3 will not be folding in or out automatically.

If "Yes" in step S2, a check is carried out in step S4 to determine whether a parking assistant, which operates using sonar or ultrasonic sensors mounted in the area of the four corners of the vehicle 1, signals an obstacle such as the wall 4 on the side of the vehicle door 2.

If "No" in step S4, a check is carried out in step S5 to determine whether a blind-spot warning system, i.e., an information system comprising a sensor in the exterior mirror 3 for warning against objects in the blind spot of the exterior mirror 3, signals such an object.

If "No" in step S5, a check is carried out in step S6 to determine whether the door-opening speed is below a predefined threshold value. The door-opening speed can be detected, e.g., with the aid of a door-opening-state sensor which indicates the present door-opening angle.

If "No" in step S6, a check is carried out in step S7 to determine whether the remaining door-opening angle of the vehicle door, i.e., the angle remaining to reach the maximum door-opening angle, is less than a predefined threshold value.

If "No" in step S7, then, in step S8, the exterior mirror 3 is left in the position in which it was. In this case, it is assumed that the vehicle user does not foresee any problems with stepping into and out of the vehicle and, therefore, it is also not necessary to fold in the exterior mirror 3.

If "Yes" in any of the steps S4 to S7, a check is carried out in step S9 to determine whether the exterior mirror 3 has already been folded into the "parking position", e.g., triggered manually by the driver.

If "Yes" in step S9, the exterior mirror 3 remains in the folded in position (step S8).

If "No" in step S9, the exterior mirror 3 folds in, into the "parking position" (step S10).

An automatic folding-out of the exterior mirror 3 can also be carried out on the basis of the criteria shown in FIG. 4, or on the basis of similar criteria.

Only the switch between two mirror positions was described above. Reference to either the folded out or the folded in position above is, specifically, a reference to a fully folded out or a fully folded in position, respectively. In addition to the folded out position and the folded in position, however, yet another stable intermediate position or multiple or numerous stable intermediate positions of the exterior mirror can be provided.

Therefore, the exterior mirror can be moved into certain assigned intermediate positions when the vehicle door is opened at certain speeds or within certain speed ranges. Alternatively or additionally, the exterior mirror can be moved into certain assigned intermediate positions when the vehicle door is opened by certain angles.

Directional terms such as "forward," "rear," "forward travel," etc., are used with reference to the normal operational attitude of the vehicle and should not be considered limiting. It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
folding in an exterior mirror of a motor vehicle having a door with a rear-mounted hinge, the exterior mirror folded in when the door is opened and when a speed at which the door is opened is less than a predefined threshold value.

2. The method as recited in claim 1, further comprising: determining that the door has been opened in response to a signal from a door-release sensor or a door-opening-state sensor.

3. The method as recited in claim 1, wherein the exterior mirror is folded in when a remaining door-opening angle of the door is less than a predefined threshold value.

4. The method as recited in claim 1, wherein the exterior mirror is foldable to a folded in position, a folded out position, and a plurality of intermediate positions between the folded in and folded out positions.

5. The method as recited in claim 4, wherein the exterior mirror is moved to one of the intermediate positions when the vehicle door is opened at a predefined speed.

6. The method as recited in claim 4, wherein the exterior mirror is moved to one of the intermediate positions when the vehicle door is opened by a predefined angle.

7. The method recited in claim 1, wherein the exterior mirror is mounted to a body of the vehicle ahead of the vehicle door relative to a direction of forward travel.

8. The method as recited in claim 1, wherein the exterior mirror is mounted on the vehicle door.

9. The method as recited in claim 1, wherein the exterior mirror is folded in with the aid of an electric motor.

10. A motor vehicle, comprising:
a door with a rear-mounted hinge; and
an exterior mirror moveable between a folded in position and a folded out position, wherein the exterior mirror is folded in when the door is opened and when a speed at which the door is opened is less than a predefined threshold value.

11. The motor vehicle as recited in claim 10, further comprising a control unit configured to determine when the door is opened and to command the exterior mirror to fold to the folded in position when the speed at which the door is opened is less than the predefined threshold value.

12. The motor vehicle as recited in claim 11, further comprising one of a door-release sensor and a door-opening-state sensor in communication with the control unit, the control unit configured to interpret signals from either the door-release sensor or the door-opening state sensor to determine when the door is opened.

13. The motor vehicle as recited in claim 11, wherein the control unit commands the exterior mirror to fold to the folded in position when a remaining door-opening angle of the door is less than a predefined threshold value.

14. The motor vehicle recited in claim 10, wherein the exterior mirror is mounted either (1) on a body of the vehicle ahead of the door relative to a direction of forward travel or (2) on the door.

15. The motor vehicle as recited in claim 10, wherein the exterior mirror is folded in with the aid of an electric motor.

* * * * *